United States Patent [19]
Morris

[11] Patent Number: 4,861,490
[45] Date of Patent: Aug. 29, 1989

[54] REMOVAL OF CATIONIC IMPURITIES FROM INORGANIC SOLUTIONS

[75] Inventor: Susan B. Morris, Lithia, Fla.

[73] Assignee: Phosphate Engineering & Construction Co., Inc., Lakeland, Fla.

[21] Appl. No.: 87,915

[22] Filed: Aug. 21, 1987

[51] Int. Cl.$^4$ ............................................ B01D 15/04
[52] U.S. Cl. .................................... 210/669; 210/677; 210/681; 210/687; 210/688; 423/356; 521/26
[58] Field of Search ............... 210/669, 670, 677, 681, 210/687, 688; 521/26; 423/356

[56] References Cited

U.S. PATENT DOCUMENTS 2,628,165  2/1953  Bliss ..................................... 210/677
4,511,675  4/1985  Auerswald ............................. 521/26

OTHER PUBLICATIONS

"Swenson Industrial Scale-Up of a Phosphoric Acid Purification Process", by James E. Van Wyk, P.E. 11/11/86.

Primary Examiner—Ivars Cintins
Attorney, Agent, or Firm—Dowell & Dowell

[57] ABSTRACT

A process for the removal of cationic impurities from inorganic solutions and especially wet process phosphoric acid solutions wherein the solutions are passed through an ammonium ion or hydrogen ion charged cation exchange resin to remove various metal cations and thereafter the ion exchange resin is regenerated using an excess volume of ammonium sulfate solution which is subsequently treated to precipitate and filter out the cationic impurities so that the ammonium sulfate solution may be recycled for further ion exchange regeneration.

16 Claims, 4 Drawing Sheets

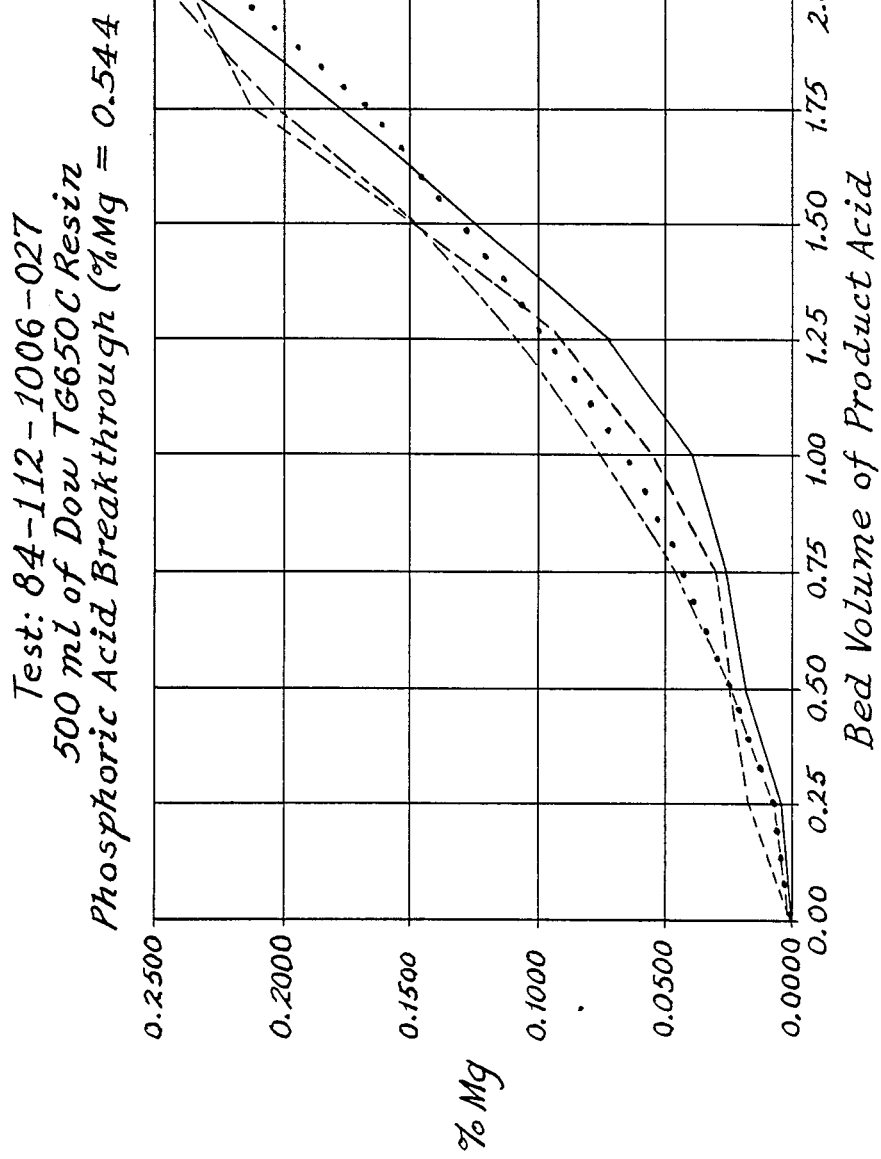

REMOVAL OF CATIONIC IMPURITIES FROM INORGANIC SOLUTIONS

BACKGROUND OF THE INVENTION

1. Field of the Invention

This invention is generally directed to the removal of cationic impurities from inorganic solutions and more specifically to the removal of metals such as magnesium, calcium, potassium, iron, sodium, vanadium, aluminum and environmentally sensitive metals, such as cadmium, from wet process phosphoric acid using an ammonium ion or hydrogen ion loaded ion exchange resin which is regenerated utilizing a saturated solution of ammonium sulfate. The metals stripped from the ion exchange resin are removed from solution by precipitation and filtered thereby conditioning the ammonium sulfate solution for further use. The process is particularly suitable for removing significant amounts of magnesium and cadmium from wet process phosphoric acid solutions as well as other trace metals to thereby obtain a relatively pure phosphoric acid which may be processed into fertilizer products. The process, however, may be utilized in other acid processing such as in the production of boric acid.

2. Description of the Related Art

When phosphate rock is reacted with phosphoric acid and sulfuric acid to produce phosphoric acid, known as the wet process, many impurities that are in the rock are dissolved in the acid. These impurities are principally iron, aluminum, fluorine, magnesium, calcium, sodium, potassium and cadmium. Such impurities create problems in processing the acid and in converting it into fertilizer products. The impurities react to form sludge when the acid is concentrated and thereby increase the acid viscosity and also cause grade problems in the production of ammoniated phosphate fertilizers, such as monoammonium (MAP) and diammonium (DAP) phosphates. Low impurity phosphate reserves are being depleted on a worldwise basis with much of the remaining reserves containing significantly higher levels of magnesium and other impurities. Current ore beneficiation methods are not effective or economical in reducing the magnesium from the ore prior to producing acid. Existing ion exchange processes to remove these impurities from the phophoric acid are limited in the levels of magnesium that can be removed and often require large expenditures for chemicals used in resin regeneration. Also, the disposal of waste impurities and contaminated regeneration solutions requires additional material handling and increased production costs as such byproducts must be disposed of in such a manner as to prevent any damage to the environment.

One ion exchange process for removing magnesium from wet process phosphoric acid is known as the Swenson FBCSP purification system. This process uses a strong acid cation exchange resin in the hydrogen form. Regeneration of the resin is accomplished using a solution of sulfuric acid. The magnesium is precipitated from the spent regeneration sulfuric acid by raising the sulfuric acid concentration to 75% by the addition of 98% $H_2SO_4$. After filtration, the 75% sulfuric acid solution is sent to the phosphoric acid attack system for acidulation of the phosphate rock. Because this regeneration system is directly tied to the reaction system, the amount of $H_2SO_4$ available for regeneration is limited, which thus limits the amount of magnesium which can be removed from the phosphoric acid. In addition, the water added to the acidulation system by the dilute (75%) sulfuric acid versus the normal 98% sulfuric acid causes serious water balance problems in the circuit. Higher levels of magnesium in the phosphoric acid require greater quantities of regeneration sulfuric acid than that which can be used in the reaction system. This results in a limitation of the amount of magnesium which can be removed from the phosphoric acid without the purchase and subsequent handling and disposal of large amounts of sulfuric acid.

SUMMARY OF THE INVENTION

This invention is directed to an ion exchange process for removing magnesium and other metal impurities from inorganic solutions and in particular wet process phosphoric acid solutions. The feed solutions, which are normally received at 140° F. (60° C.), are filtered, if necessary, to remove solids, and then pass through an ion exchange column. The ion exchange column is loaded with a cation exchange resin which has been contacted with a saturated ammonium sulfate solution so as to put the resin into an ammonium (NH4+) form. As the acid solution passes through the ion exchange column, magnesium, calcium, iron, aluminum and trace amounts of potassium, sodium, cadmium and other metal cations are removed and replaced with the ammonium ion thereby creating a product acid solution which may be used to produce specification grade monoammonium and diammonium phosphate fertilizers. The ion exchange column is thereafter washed with water and regenerated using a saturated ammonium sulfate solution. A first portion of the regenerant solution is passed through the exchange column thereby stripping a major portion of the metal cations therefrom. The first regenerant solution is subsequently filtered to remove solids precipitated therein. Thereafter, the diluted ammonium sulfate solution is reconcentrated to a saturated state either directly by the addition of $NH_3$ and crystalline $(NH_4)_2SO_4$ or by the addition of $NH_3$ in order to further precipitate metal hydroxides, filtering and subsequent addition of sulfuric acid. The reconcentrated ammonium sulfate is thereafter stored for further use to regenerate the ion exchange resin after a subsequent acid treatment step. A second portion of regenerant solution is thereafter passed through the ion exchange column and then reconcentrated in the same manner as the first portion. Approximately four (4) to ten (10) bed volumes of regenerant are required to be passed through the ion exchange column in order to obtain complete resin regeneration.

If ammonia is not desirable in the product solution a two-stage regeneration may be used. The feed solutions are contacted with the ion exchange resin which has previously been contacted with an acidic solution so as to put the resin in the H+ form. As the solution passes through the ion exchange resin, magnesium, calcium, iron, aluminum, potassium, sodium, and cadmium are removed and replaced with H+ ions. The ion exchange resin is thereafter washed with water and regenerated using a saturated ammonium sulfate solution as previously described. Then the ion exchange resin in returned to the H+ form using an acidic regenerant. If the regenerant used is sulfuric acid, the resulting ammonium sulfate solution may be concentrated and used in the first regeneration step, or neutralized with lime to recover the ammonia.

It is the primary objective of the invention to provide a process for removing cationic impurities from inorganic solutions using an ion exchange resin which may be regenerated using a recyclable regenerant solution to thereby provide an efficient method for obtaining purified inorganic solutions and especially purified phosphoric acids from impure wet process phosphoric acids while minimizing the costs of supply and disposal of the ion exchange regenerant.

It is another objective of the invention to provide a process for removing metallic impurities from inorganic solutions using an ion exchange process which is not limited as to the level of impurity reduction that can be achieved by having to consume any portion of the regenerating solution used to recharge or regenerate the ion exchange resin.

It is a further objective of the present invention to utilize a cation ion exchange resin in either the NH4+ form or H+ form for removing or reducing the concentration of magnesium, calcium and other cationic impurities from inorganic solutions and, in particular, wet process phosphoric acid solutions wherein the ion exchange resin is regenerated by using saturated ammonium sulfate solutions with the cationic impurities being removable as a precipitate from the regenerant solution.

BRIEF DESCRIPTION OF THE DRAWINGS

FIG. 5 is a graph of four cycles of tests utilizing the process of the present invention to treat a wet process phosphoric acid.

DESCRIPTION OF THE PREFERRED EMBODIMENT

With continued reference to the drawings, the process for removing cationic impurities from inorganic solutions will be discussed as the process is utilized to purify wet process phosphoric acid to obtain a phosphoric acid which can be used to produce specification grade monoammonium (MAP) and diammonium (DAP) phosphate fertilizers. In the process, a feed solution of wet process phosphoric acid, which is generally in the range of from approximately 28 to 30% P2O5 phosphoric acid, passes from a feed acid storage chamber 10 and if necessary through a polishing filter 11 wherein solids which could plug the downstream ion exchange resin bed are removed and returned as sludge via line 12 to the wet process acid treatment plant. In some instances, lesser or greater concentrations of P2O5 may be used in the feed solution.

If necessary, the feed acid solution is subsequently reheated in heat exchanger 14 to a temperature of approximately 140° F. (60° C.). Preliminary indications are that the NH4+/metal cation exchange efficiency through the ion exchange column 15 will be increased at the elevated temperature as compared with a feed solution at ambient temperature. The apparent cause of this improvement is that the NH4+/metal cation exchange is diffusion limited. Higher exchange efficiencies at lower mass flow rates also support this reasoning. Tests performed using feed solutions having lesser concentrations of P2O5 such as approximately 14% P2O5 acid indicate improved metal cationic loading on the ion exchange resin. This is probably due to the reduced hydrogen ion concentration which competes with the impurities for the active resin sites.

Figure 1:
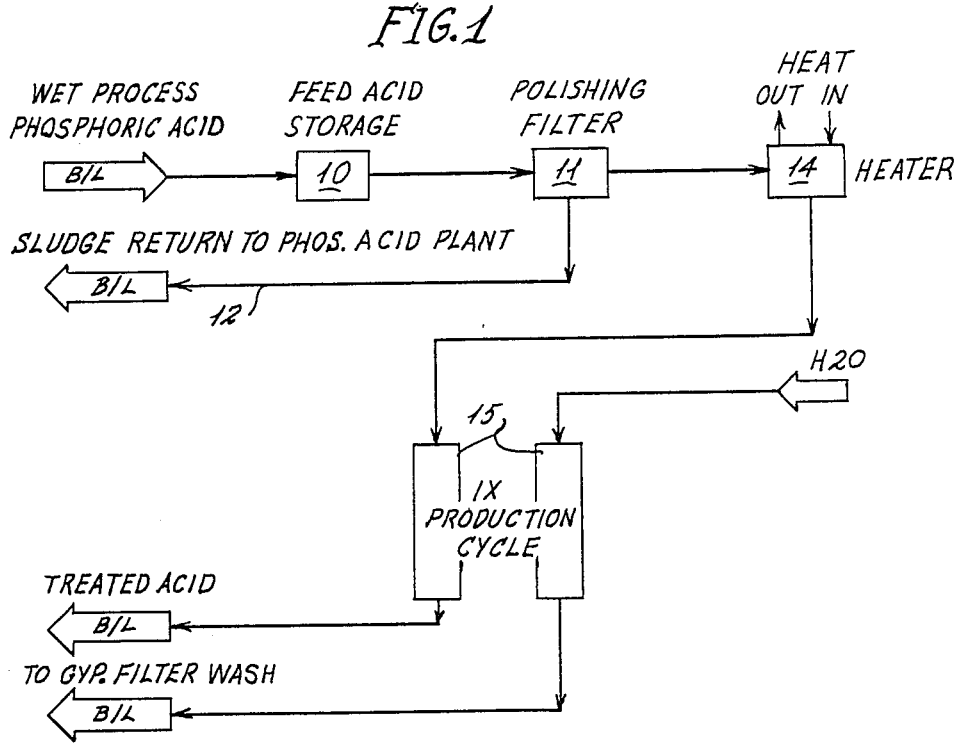
FIG. 1 is a flow diagram showing one process for removing cationic impurities from a wet process phosphoric acid solution using an ammonium loaded ion exchange resin.
Figure 2:
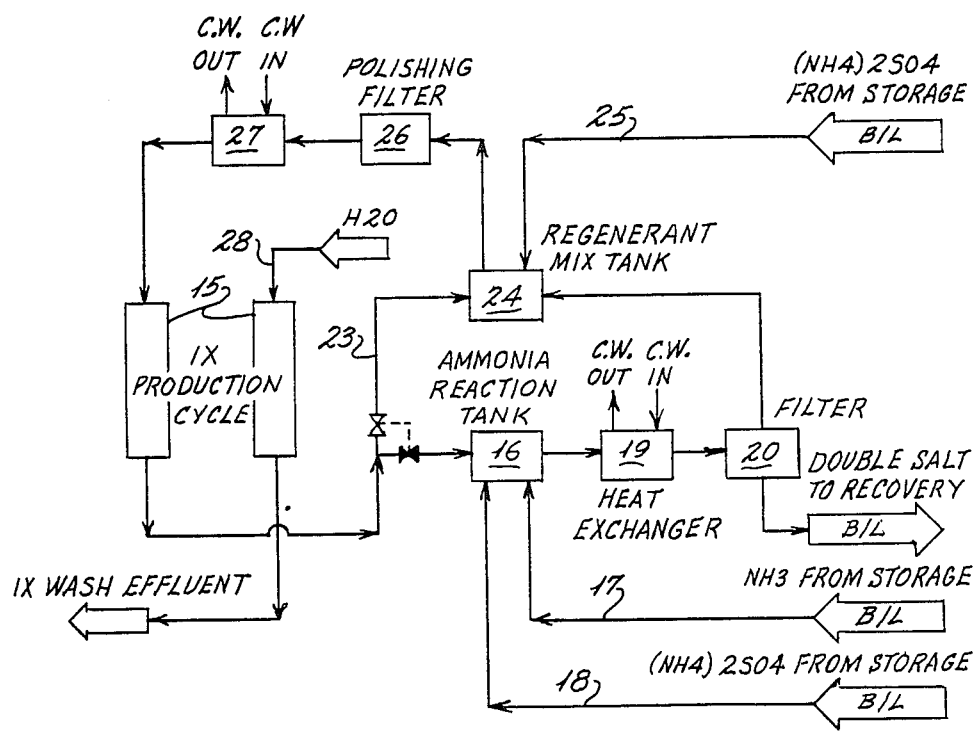
FIG. 2 is a flow diagram showing a first method for ion exchange regeneration for the process of FIG. 1.
Figure 3:
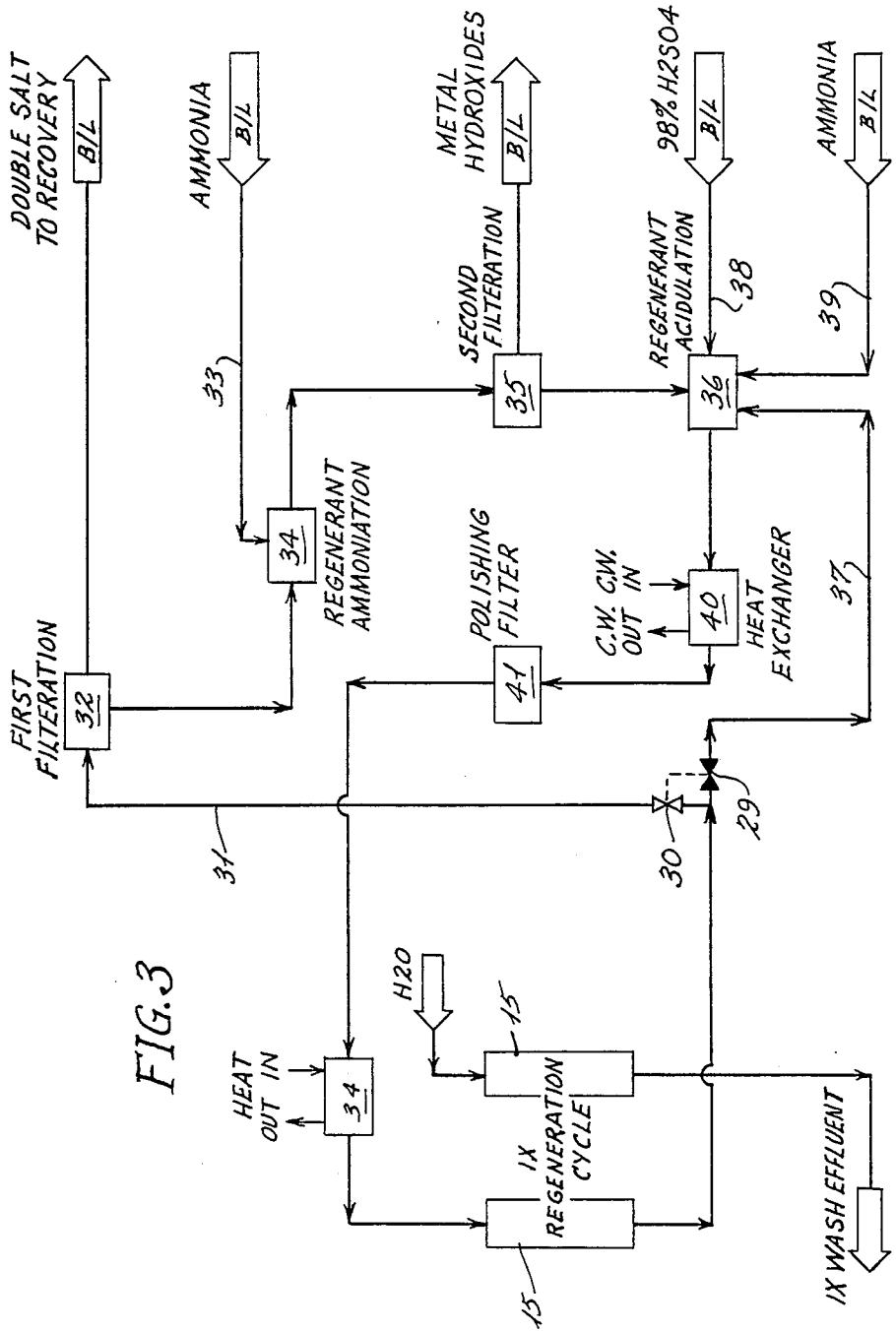
FIG. 3 is a flow diagram showing a second method for ion exchange regeneration for the process of FIG. 1.

The ion exchange column 15 is loaded with a cation exchange resin which may either be in the ammonium or hydrogen ion form. In the processes as shown in FIGS. 1-3, the cation exchange resin has been contacted with a saturated ammonium sulfate solution so that the resin is in the ammonium NH4+ state. As the acid feed solution passes through the ion exchange column 15, the metallic impurities including magnesium, calcium, iron, aluminum, potassium, sodium and cadmium will be loaded onto the ion exchange resin and replaced by ammonium ions to create a resultant product solution which is approximately 0.5-1.5% NH4 by weight. The treated product acid solution is thereafter directed to appropriate storage areas (not shown).

In addition to satisfying the original objective of providing an acid which can be used to produce specification grade MAP and DAP, this process provides two other benefits. The first is, the reduction of post-precipitated solids normally experienced upon concentrating the acid of 54% P2O5 acid, and, the second is the reduction in viscosity at 54% and super acid concentrations.

As a result of the ion exchange processing, the MgO concentrations are reduced from approximately 1.0% to 0.10%. Lower concentrations on the order of 0.02% MgO, are possible, if desired. CaO concentrations are reduced to trace amounts (0.005% CaO) and total Fe concentrations reduced 10-15%, from initial Fe concentration of approximately 0.50% Fe in 30% P2O5 acid. A further decrease of the iron concentration is possible by reducing the iron from the ferric (Fe3+) to the ferrous (Fe2+) oxidation state. CdO concentrations are reduced from approximately 60 ppm to less than 5 ppm in 30% P2O5 acid. Although not typical, much higher levels of MgO in the feed phosphoric acid can be processed as well.

After the acid solution has passed through the ion exchange column, a wash water is passed therethrough and the effluent conveyed to a filter wash collection area.

A critical factor in any ion exchange process is the regeneration of the resin to a usable form. In the present system, a unique process of recycling a regeneration solution is used. A first portion of a saturated solution of ammonium sulfate is contacted with the impurity loaded resin. The resulting solution, containing most of the impurities, is collected separately. This first portion consists of dilute (NH4)2SO4 and precipitated calcium, and magnesium, as CaSO4.(NH4)2SO4.H2O and MgSO4.(NH4)2SO4.6H2O respectively, and other insoluble salts. As most of the impurities are stripped with the first portion of regenerant it is beneficial to treat this portion separately, as it reduces the volume of solution needing treatment. These solids are removed from the solution by filtering. If desired, these solids could be slurried with water and lime to recover NH3, which could be sent back to the regeneration solution makeup. They can also be slurried with water, NH3 and CO2 to produce precipitated metal carbonates or hydroxides, or reacted with KCl to produce precipitated K2SO4.

The dilute (NH4)2SO4 filtrate which results from passing the regenerant ammonium sulfate solution through the ion exchange column 15 may be reconcentrated for recycled use as an ion exchange regenerant by one of two processes. With reference to FIG. 2, the filtrate is treated in one process by the addition of ammonia (NH3) and crystalline (NH4)2SO4 in order to bring the final concentration to saturation. Due to the dissociation of H3PO4, hydrogen ions in solution compete with the other cations for the active resin sites, and load onto the resin. When the ammonium ion in the regenerant displaces the H+ ion, the solution is acidic due to an excess of free sulfuric acid. In this process, stoichimetric amounts of NH3 are added to neutralize the excess H+. Addition of crystalline (NH4)2SO4 increases the concentration of the solution at which time further precipitation of impurities will occur.

A first portion of the (NH4)2S04 regenerant passes from the ion exchange column 15, through valve 21 to an ammonia reaction tank 16 which is supplied with NH3 and (NH4)2SO4 through lines 17 and 18. Upon cooling through heat exchanger 19, the resultant solution is passed through filter 29 wherein the metallic impurities are removed as a precipitate and the regeneration solution of ammonium sulfate is conducted to a holding and mixing tank 24. After the first portion of ammonium sulfate regenerant is collected and separated, a second portion of the regenerant is contacted with the resin. Approximately 4–10 bed volumes of solution is necessary to achieve equilibrium between the resin and the recycled ammonium sulfate solution. This excess volume of regenerant is a critical step in obtaining complete resin regeneration. Lesser volumes will not remove all of the metal impurities on the resin. Incomplete resin regeneration will cause premature cation impurity breakthrough and leakage in the production cycle. This second portion of regenerant solution from the ion exchange column 15, is conveyed through valve 22 and line 23 and recombined in the mix tank 24 with the first portion that has been previously purified and reconcentrated. Additional or makeup (NH4)2SO4 may be added to the tank 24, if necessary, through line 25. When regeneration is necessary, the saturated ammonium sulfate solution from tank 24 is passed through filter 26, heat exchanger 27 and into the ion exchange column 15. Thereafter, the resin in the ion exchange column 15 is washed with water as shown at 28.

In the second method of processing the regenerant solution and as shown in FIG. 3, the first portion of the (NH4)2SO4 regenerant passes from the ion exchange column 15 through valve 30 and line 31 through filter 32 and is subjected to the addition of NH3 from line 33 in tank 34 wherein metal hydroxides are precipitated. The solution is then passed through filter 35 for the removal of the hydroxides and is conducted to an acidulation tank 36. The second portion of the regenerate passes from the ion exchange column 15 through valve 29 and line 37 and is combined with the first portion in the acidulation tank 36. H2SO4 from line 38 and NH3 from line 39 are added, as needed, to reconcentrate the ammonium sulphate regenerant. Upon cooling through the heat exchanger 40, the solution is passed through filter 41, heat exchanger 42 and is ready for the next ion exchange cycle through column 15.

Figure 4:
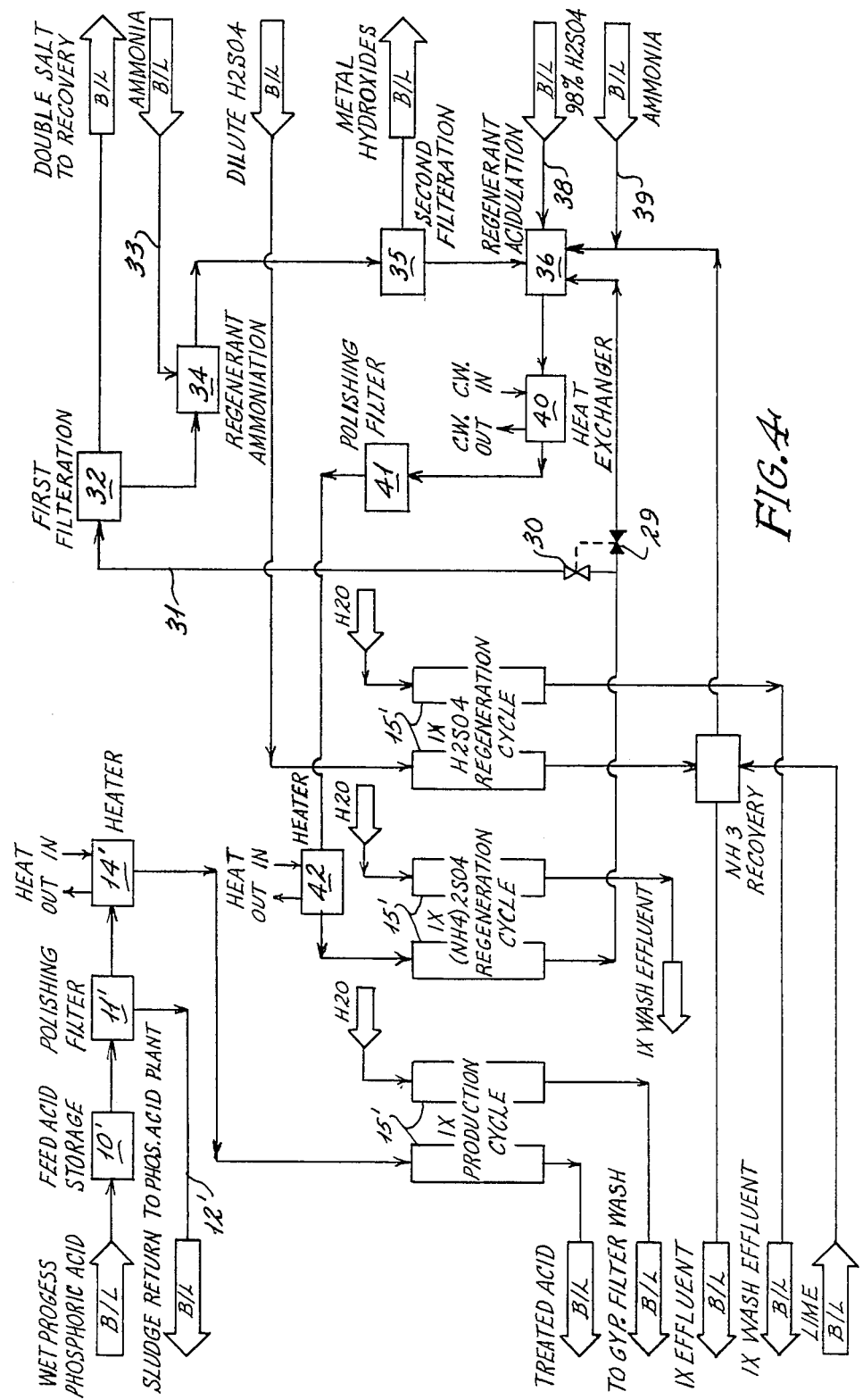
FIG. 4 is a flow diagram showing the ion exchange process using a hydrogen loaded resin for the production cycle and a two-stage regeneration using the second method for resaturation of the ammonium sulfate regenerant followed by a treatment of the resin with an acid regenerant to return the resin to the hydrogen form.

With reference to FIG. 4, the process for removing the impurities in solution by a cation exchange resin in the H+ form and for regenerating the resin is disclosed. In the process, feed acid from storage chamber 10' passes, if necessary, through a filter 11' and heat exchanger 14' to the ion exchange column 15'. The ion exchange column 15' is loaded with a cation exchange resin in the H+ form. As the acid passes through the ion exchange column 15', the impurities will be loaded onto the resin and replaced by H+ ions. The treated acid is directed to appropriate storage areas.

After the acid solution has passed through the ion exchange column 15', a wash water is passed through the column and the effluent conveyed to a filter wash collection area.

The regeneration of the resin is accomplished in a two stage process. In the first stage, regeneration of the resin is accomplished using a saturated solution of ammonium sulfate. Precipitation of the impurities and subsequent reconcentration of the ammonium sulfate regenerant is accomplished by either of the two previously mentioned processes as shown in FIG. 2 or FIG. 3. The process steps of FIG. 3 are shown in FIG. 4.

After the first stage processing which is described above with respect to FIG. 4, a dilute solution of sulfuric acid is passed via line 45 through the NH4+ loaded column 15'. Hydrogen ions replace the NH4+ on the resin returning the resin back to the desired form. The resultant dilute ammonium sulphate solution is directed via line 46 to a neutralization tank 47 where lime is added to recover the NH3 which is returned to the regeneration acidulation tank 36 to be combined with the conditioning of the (NH4)2 SO4 regenerant.

EXAMPLE

The system described in FIG. 1 and FIG. 2 was employed on a bench scale to treat wet process phosphoric acid obtained from a central Florida facility. Additional magnesium was added to the acid for the equivalent of 1.0% MgO concentration at 30% P2O5 concentration. The resin used was Dow 650-C, a strong acid cation exchange resin contacted with a saturated ammonium sulfate solution to put it in the NH4+ form.

The treatment column measured 1.5" diameter by 20" high, and was charged with 500 ml resin.

The acid treatment procedure was carried out continually in the following cycle of operation, starting by downflow filling the column of the ion exchanger with 1½ bed volumes acid at 2.7 GPM/ft2 flow rate. The resin was washed with 2 bed volumes of water drained and dried by vacuum. The analytical results for the treated acid are given in Table I.

Ten bed volumes of saturated ammonium sulfate regenerant was introduced into the top of the column and contacted with the resin at a 1.5–2.5 GPM/ft2 flow rate, where the metallic impurities were exchanged for the NH4+ ion. Crystalline ammonium sulfate was added to the composited solution exiting the column to bring the solution to saturation, and precipitate the impurities. The impurities were filtered from the solution and analyzed. The filtered regenerant was set aside for the next cycle. Table II and III lists the analytical results for the recycled regenerant and precipitated impurities.

The resin, now in the NH4+ form again, was washed with water, drained and dried by vacuum.

The cycle described above was repeated four times with the results indicating the continued effectiveness of the recycled regenerant solution to prepare the ion exchange bed for continued processing of wet process phosphoric acid solutions.

TABLE I

TYPICAL RESULTS OF WET PROCESS ACID TREATMENT WITH ION EXCHANGE RESIN

| | % P2O5 | % Mg | % Ca | % Fe | % Al | % K | % Na | Spg | % NH4 |
|---|---|---|---|---|---|---|---|---|---|
| Feed Acid | 27.98 | 0.531 | 0.099 | 0.457 | 0.574 | <0.01 | <0.04 | 1.3316 | 0.010 |
| Product Cycle 1 | 22.39 | 0.034 | <0.0006 | 0.366 | 0.420 | — | — | 1.2508 | 2.12 |
| Product Cycle 2 | 22.75 | 0.022 | <0.0006 | 0.372 | 0.435 | — | — | 1.2540 | 2.06 |
| Product Cycle 3 | 23.64 | 0.042 | <0.0006 | 0.396 | 0.413 | — | — | 1.2672 | 2.07 |
| Product Cycle 4 | 23.02 | 0.051 | 0.0012 | 0.396 | 0.411 | — | — | 1.2648 | 2.02 |

TABLE II

IMPURITY CONCENTRATION AT EQUILIBRIUM WITH SATURATED(NH4)2SO4 REGENERANT

| | % NH4 | % SO4 | % Mg | % Ca | % Fe | % Al | % K | % Na | Spg |
|---|---|---|---|---|---|---|---|---|---|
| Feed Regen | 10.96 | 30.30 | — | — | — | — | — | — | 1.2372 |
| Cycle 1 | 11.36 | 30.97 | 0.049 | 0.024 | 0.008 | <0.025 | <0.012 | 0.005 | 1.2404 |
| Cycle 2 | 11.69 | 31.49 | 0.041 | 0.044 | 0.011 | <0.025 | <0.012 | 0.009 | 1.2472 |
| Cycle 3 | 11.97 | 32.05 | 0.046 | 0.060 | 0.013 | 0.026 | <0.012 | 0.013 | 1.2496 |
| Cycle 4 | 11.95 | 32.18 | 0.038 | 0.083 | 0.014 | 0.028 | <0.012 | 0.019 | 1.2540 |

TABLE III

COMPOSITION OF PRECIPITATED IMPURITIES FROM SATURATED REGENERANT

| | % Mg | % Ca | % Fe | % K | % Na | % Al | % NH4 | % SO4 |
|---|---|---|---|---|---|---|---|---|
| Cycle 1 | 8.03 | 0.006 | 0.488 | 0.034 | 0.006 | <0.025 | 12.23 | 66.81 |
| Cycle 2 | 6.45 | 0.017 | 0.449 | 0.025 | 0.007 | <0.025 | 13.02 | 59.69 |
| Cycle 3 | 5.68 | 0.029 | 0.457 | 0.025 | 0.008 | <0.025 | 12.89 | 60.56 |

I claim:

1. A method for removing cationic impurities from inorganic feed solutions comprising the steps of passing the feed solution through an ion exchanger having an ion exchange resin charged with a cation selected from the group consisting of ammonium ions and hydrogen ions in order to remove the cationic impurities from the feed solution, regenerating the ion exchange resin within the ion exchanger by passing a saturated ammonium sulfate regenerant solution therethrough and recovering a dilute regenerant solution, resaturating the dilute regenerant solution passing from the ion exchanger to thereby precipitate impurities therefrom as sulfate salts and recovering a resaturated ammonium sulfate solution.

2. The method of claim 1 in which at least 4-10 bed volumes of saturated ammonium sulfate solution are used to regenerate the ion exchange resin.

3. The method of claim 1 including the additional steps of filtering the dilute regenerant solution passing from the ion exchanger to remove solids therefrom prior to resaturating, said resaturating of the dilute regenerant solution including adding NH3 to the dilute regenerant solution to form metallic hydroxides, filtering the metallic hydroxides from the dilute regenerant solution and subsequently adding substantially pure sulfuric acid to the dilute regenerant solution to obtain said resaturated ammonium sulfate solution, and thereafter recycling the resaturated ammonium sulfate solution to the ion exchanger.

4. The method of claim 3 in which at least 4-10 bed volumes of saturated ammonium sulfate solution are used to regenerate the ion exchange resin.

5. The method of claim 4 including the additional step of passing a dilute solution of sulfuric acid through the ion exchanger to replace ammonium ions with hydrogen ions and obtaining an effluent of dilute ammonium sulfate solution, and thereafter recovering the ammonia therefrom.

6. The method of claim 5 in which said inorganic solution is a wet process phosphoric acid solution which is maintained at a temperature of approximately 140° F.

7. The method of claim 1 in which the resaturating of the dilute regenerant solution passing from the ion exchanger is achieved by adding NH3 and (NH4)2SO4, thereafter filtering and recovering said resaturated ammonium sulfate solution, and recycling said resaturated ammonium sulfate solution to the ion exchanger.

8. The method of claim 7 in which at least 4-10 bed volumes of saturated ammonium sulfate solution are used to regenerate the ion exchange resin.

9. The method of claim 8 including the additional step of passing a dilute solution of sulfuric acid through the ion exchanger to replace ammonium ions with hydrogen ions and obtaining an effluent of dilute ammonium sulfate solution, and thereafter recovering the ammonia therefrom.

10. The method of claim 1 in which said inorganic solution is a wet process phosphoric acid solution.

11. A method for removing cationic impurities from a wet process phosphoric acid solution comprising the steps of:
(a) passing the wet process phosphoric acid solution through an ion exchanger having an ion exchange resin charged with cations selected from the group of ammonium ions and hydrogen ions, in order to remove the cationic impurities from the solution;
(b) regenerating the ion exchange resin by passing first and second portions of a saturated ammonium sulfate regenerant solution therethrough in which a total of 4-10 bed volumes of saturated ammonium sulfate solution are used to regenerate the ion exchange resin;

(c) filtering the first portion of regenerant solution passing from the ion exchanger to remove solids therefrom;

(d) adding $NH_3$ to the first portion of regenerant solution to form metallic hydroxides;

(e) filtering the metallic hydroxides from the first portion of regenerant solution;

(f) thereafter combining the second portion of regenerant solution passing from the ion exchanger with the first portion regenerant solution and adding substantially pure sulfuric acid thereto to obtain a resaturated ammonium sulfate regenerant solution; and (g) subsequently recycling the resaturated ammonium sulfate regenerant solution to the ion exchanger.

12. The method of claim 11 including the additional step of initially filtering the wet process phosphoric acid solution to remove solids therefrom.

13. The method of claim 12 including the additional step of heating the wet process phosphoric acid solution to a temperature of approximately 140° F. prior to passing the solution through the ion exchanger.

14. The method of claim 11 including the additional step of passing a dilute solution of sulfuric acid through the ion exchanger to replace ammonium ions with hydrogen ions, obtaining an effluent of dilute ammonium sulfate solution, and thereafter recovering the ammonia therefrom.

15. A method for removing cationic impurities from a wet process phosphoric acid solution comprising the steps of (a) passing the solution through an ion exchanger having an ion exchange resin charged with cations selected from the group of ammonium ions and hydrogen ions, in order to remove the cationic impurities from the solution;

(b) regenerating the exchange resin by passing a saturated ammonium sulfate regenerant solution therethrough in which 4–10 bed volumes of saturated ammonium sulfate regenerant solution are used to regenerate the ion exchange resin;

(c) resaturating the regenerant solution passing from the ion exchanger by adding $NH_3$ and $(NH_4)2SO_4$ to obtain a resaturated ammonium regenerant solution, and filtering;

(d) subsequently recycling the resaturated ammonium regenerant solution to the ion exchanger.

16. The method of claim 15 including the additional step of passing a dilute solution of sulfuric acid through the ion exchanger to replace ammonium ions with hydrogen ions obtaining an effluent of dilute ammonium sulfate solution, and thereafter recovering the ammonia therefrom.

* * * * *